US009019687B2

(12) United States Patent
Morris, III et al.

(10) Patent No.: US 9,019,687 B2
(45) Date of Patent: Apr. 28, 2015

(54) SYSTEMS AND METHODS FOR CURRENT DENSITY OPTIMIZATION IN CMOS-INTEGRATED MEMS CAPACITIVE DEVICES

(75) Inventors: Arthur S. Morris, III, Raleigh, NC (US); Saravana Natarajan, Irvine, CA (US); Dana DeReus, Santa Ana, CA (US)

(73) Assignee: Wispry, Inc., Irvine, CA (US)

( * ) Notice: Subject to any disclaimer, the term of this patent is extended or adjusted under 35 U.S.C. 154(b) by 76 days.

(21) Appl. No.: 13/491,583

(22) Filed: Jun. 7, 2012

(65) Prior Publication Data

US 2012/0314335 A1 Dec. 13, 2012

Related U.S. Application Data

(60) Provisional application No. 61/520,283, filed on Jun. 7, 2011.

(51) Int. Cl.

*H01G 5/16* (2006.01)
*H01G 5/18* (2006.01)
*H01H 59/00* (2006.01)

(52) U.S. Cl.

CPC . *H01G 5/16* (2013.01); *H01G 5/18* (2013.01); *H01H 59/0009* (2013.01)

(58) Field of Classification Search

USPC .............. 361/277, 278, 281, 283.1, 287, 290, 361/292, 272–273

See application file for complete search history.

(56) References Cited

U.S. PATENT DOCUMENTS

| | | | | |
|---|---|---|---|---|
| 6,404,614 | B1 * | 6/2002 | Zhu et al. | 361/277 |
| 2003/0122206 | A1 | 7/2003 | Bhattarai | |
| 2004/0227428 | A1 | 11/2004 | Sinclair | |
| 2008/0122313 | A1 | 5/2008 | Mabuchi | |
| 2010/0182731 | A1 * | 7/2010 | Steeneken et al. | 361/281 |
| 2011/0170226 | A1 * | 7/2011 | Oakes et al. | 361/281 |

FOREIGN PATENT DOCUMENTS

| | | |
|---|---|---|
| EP | 1717195 | 11/2006 |
| EP | 2 718 225 | 4/2014 |
| JP | 2006-165380 | 6/2006 |

OTHER PUBLICATIONS

Notice of Publication for Application No. PCT/US2012/041436 dated Dec. 13, 2012.

International Search Report and Written Opinion for Application No. PCT/US2012/041436 dated Feb. 15, 2013.

* cited by examiner

*Primary Examiner* — Nguyen T Ha

(74) *Attorney, Agent, or Firm* — Jenkins, Wilson, Taylor & Hunt, P.A.

(57) ABSTRACT

The present subject matter relates to the use of current splitting and routing techniques to distribute current uniformly among the various layers of a device to achieve a high Q-factor. Such current splitting can allow the use of relatively narrow interconnects and feeds while maintaining a high Q. Specifically, for example a micro-electromechanical systems (MEMS) device can comprise a metal layer comprising a first portion and a second portion that is electrically separated from the first portion. A first terminus can be independently connected to each of the first portion and the second portion of the metal layer, wherein the first portion defines a first path between the metal layer and the first terminus, and the second portion defines a second path between the metal layer and the first terminus.

8 Claims, 6 Drawing Sheets

100
150
120
130
110a
S
115
110b
110

SYSTEMS AND METHODS FOR CURRENT DENSITY OPTIMIZATION IN CMOS-INTEGRATED MEMS CAPACITIVE DEVICES

CROSS REFERENCE TO RELATED APPLICATION

The present application claims the benefit of U.S. Provisional Patent Application Ser. No. 61/520,283, filed Jun. 7, 2011, the disclosure of which is incorporated herein by reference in its entirety.

TECHNICAL FIELD

The subject matter disclosed herein relates generally to the design of micro-electro-mechanical systems (MEMS) capacitive devices. More particularly, the subject matter disclosed herein relates to current routing within material layers of a MEMS device.

BACKGROUND

Radio-frequency (RF) MEMS devices built using standard complementary metal-oxide-semiconductor (CMOS) compatible fabrication processing on low resistivity silicon wafers are susceptible to high substrate losses due to the underlying low resistivity silicon. To address this issue, a metallic shield is commonly used to isolate the RF circuits from the lossy substrate under these circumstances. However, this metallic shield can increase the shunt parasitic capacitance of MEMS capacitors caused by the metal layers in the MEMS device and the interlayer dielectric between the shield and the device. This increase in parasitic capacitance motivates a desire to minimize the interconnect, feed, and flip chip/bond pad metallization of the MEMS device to thereby minimize the parasitics. Because the Q-factor of the RF device is inversely proportional to the resistance of the feed and interconnect metallization, however, the reduction in metallization can adversely affect the Q-factor of the device.

As a result, RF MEMS devices are desirable that have a reduced minimum capacitance ($C_{min}$) and/or parasitic capacitance without correspondingly reducing the Q-factor of the device.

SUMMARY

In accordance with this disclosure, systems and methods for current density optimization in CMOS-integrated MEMS capacitive devices are provided. In one aspect, a micro-electromechanical systems (MEMS) device is provided. The MEMS device can comprise a metal layer comprising a first portion and a second portion that is electrically separated from the first portion. A first terminus can be independently connected to each of the first portion and the second portion of the metal layer, wherein the first portion defines a first path between the metal layer and the first terminus, and the second portion defines a second path between the metal layer and the first terminus.

Although some of the aspects of the subject matter disclosed herein have been stated hereinabove, and which are achieved in whole or in part by the presently disclosed subject matter, other aspects will become evident as the description proceeds when taken in connection with the accompanying drawings as best described hereinbelow.

BRIEF DESCRIPTION OF THE DRAWINGS

The features and advantages of the present subject matter will be more readily understood from the following detailed description which should be read in conjunction with the accompanying drawings that are given merely by way of explanatory and non-limiting example, and in which.

DETAILED DESCRIPTION

Figure 1A:
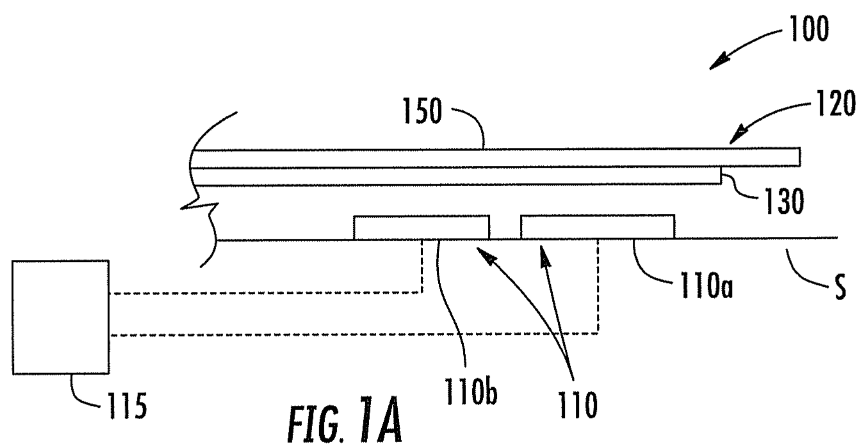
FIG. 1*a* is a side cutaway view of a micro-electromechanical systems (MEMS) device according to an embodiment of the presently disclosed subject matter.

The present subject matter involves the use of current splitting and routing techniques to distribute current uniformly among the various layers of a device to achieve a high Q-factor. Such current splitting can allow the use of relatively narrow interconnects and feeds while maintaining a high Q. In addition, the design process can also effectively optimize both Q and $C_{min}$ together because they generally cannot be optimized independently for a device having a fixed thickness. Accordingly, the present subject matter can be advantageously used for 1) minimization of $C_{min}$ and/or parasitic capacitance; 2) maximization of Q; 3) maximization of equal distribution of currents based on the volume of materials and the coalescence of current paths; and 4) minimization of temperature coefficients that can be attributed to the asymmetric division of currents through mis-design or volume mismatch. As a result, the present subject matter can help to realize RF MEMS devices having a high Q-factor on a lossy substrate. In addition, the parasitics associated with the device can be lowered, which can lead to a lower capacitance in the "Off" or "Open" state, which can in turn increase the capacitance ratio between the "On" and "Off" states. Furthermore, the distribution of currents can to be designed and analyzed so that the effects of self-heating the thermal mismatch are minimized.

To achieve these benefits, the concept of current splitting can be applied to any of a variety of current-carrying structures in an RF MEMS device. Specifically, for example, in one aspect shown in FIGS. 1A and 1B, the present subject matter can be implemented in a variable capacitor, generally designated 100. In the configuration shown in FIG. 1A, variable capacitor 100 can comprise at least one fixed metal layer (e.g., a fixed RF feed), generally designated 110, positioned on a substrate S, and a movable beam 120 can be spaced apart from fixed metal layer 110, movable beam 120 comprising a first movable metal layer, generally designated 130, that is capacitively coupled to fixed metal layer 110 and a structural dielectric layer 150 positioned on first movable metal layer 130.

In addition, those having skill in the art will recognize that other configurations for variable capacitor 100 can include additional structures. For instance, variable capacitor 100 can further comprise one or more additional metal layers below fixed metal layer 110 (e.g., within substrate S) and connected to fixed metal layer 110 using vias to form a composite fixed/bottom electrode, a fixed metal capacitor plate positioned on substrate S, a fixed dielectric layer (e.g., $SiO_2$, $Si_xN_y$, $Al_xO_y$) positioned on one or both of the fixed capacitor plate and/or fixed metal layer 110, a movable dielectric layer positioned on movable beam 120 between first movable metal layer 130 and the fixed material layers (i.e., below first movable metal layer 130), or any of a variety of other material layers depending on the desired configuration for variable capacitor 100.

Figure 1B:
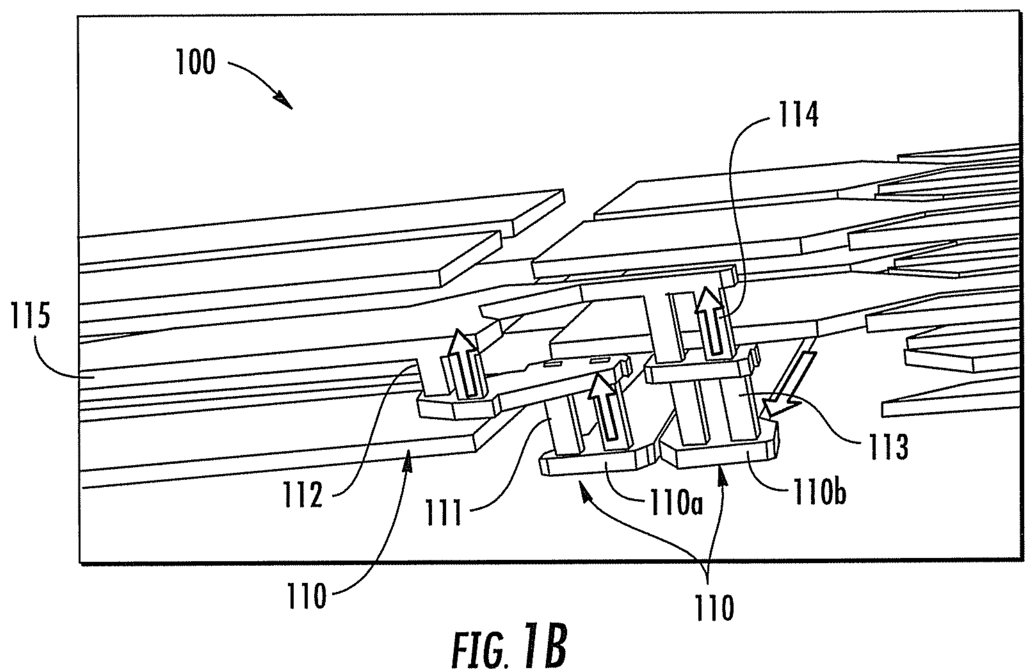
FIG. 1B is a partial perspective view of a first set of electrical connections within a micro-electromechanical systems (MEMS) device according to an embodiment of the presently disclosed subject matter.

Regardless of the specific configuration of variable capacitor 100, one or more of the metal layers can be configured to define multiple current paths within the device. Specifically, for example, referring to the configuration shown in FIGS. 1A and 1B, fixed metal layer 110 can comprise slots or other patterns that can define a first fixed portion 110*a* and a second fixed portion 110*b* that is electrically separated from first fixed portion 110*a*. In particular, first fixed portion 110*a* can be separated from second fixed portion 110*b* by a slot having a width sufficient to force separate currents to flow in each element (e.g., a width of about 0.8 μm). This slot can be provided in a "horizontal" direction (i.e., perpendicular to the length of movable beam 120) as shown in FIGS. 1A and 1B, or fixed metal layer 110 can be split in a "vertical" direction (i.e., parallel to the length of movable beam 120) or in any other direction desired. Regardless of the specific orientation of the split, with fixed metal layer 110 being split into first fixed portion 110*a* and second fixed portion 110*b*, first fixed portion 110*a* and second fixed portion 110*b* can be independently connected to a first terminus, such as a first flip chip pad, bond pad, or other terminal structure, generally designated 115.

In this way, rather than transmitting all of the current from fixed metal layer 110 to first terminus 115 by way of a single electrical connection, the current can be split such that a first path is defined between first fixed portion 110*a* and first terminus 115, and a second path is defined between second fixed portion 110*b* and first terminus 115. As a result, relatively narrow interconnects and feeds need only be provided to carry each of these partial current loads. This reduction in interconnect metal area can help to reduce $C_{min}$ and increase Q.

Specifically, for example, as shown in FIG. 1B, first fixed portion 110*a* can be in communication with a first via 111, which can in turn be in communication with a second via 112 that is connected to first terminus 115. In contrast, second fixed portion 110*b* can be provided in communication with a separate stacked combination of a third via 113 and a fourth via 114 that is directly connected to first terminus 115. In this way, two separate current paths can be established between fixed metal layer 110 (i.e., first fixed portion 110*a* and second fixed portion 110*b*) and first terminus 115. Further in this regard, although the above discussion refers only to fixed metal layer 110 being split once into two portions, those having skill in the art will recognize that fixed metal layer 110 can be split into three or more distinct portions corresponding to three or more different paths to first terminus 115 to further reduce $C_{min}$ and increase Q.

Where variable capacitor 100 comprises a multi-layer MEMS structure, this use of multiple current paths can involve routing the current across multiple metal layers above fixed metal layer 110. In particular, for example, in the configuration shown in FIG. 1B, fixed metal layer 110 can be described as being positioned at a bottom layer of variable capacitor 100 and first terminus 115 can be described as being positioned at a top layer of variable capacitor 100. A first portion of the current developed in fixed metal layer 110 can be routed from first fixed portion 110*a* to an intermediate layer between the top and bottom layers by first via 111, and from the intermediate layer to first terminus 115 at the top layer by second via 112. In contrast, the second path from second fixed portion 110*b* can be routed directly to the top layer of variable capacitor 100 by third via 113 and fourth via 114 with minimal travel through the intermediate layer. Further in this regard, it can be advantageous for the current split to occur over as much of the structure of variable capacitor 100 as possible to optimally lower the total system resistance, such as by splitting the current near the source and recombining the current at or near first terminus 115.

Despite their different paths, first fixed portion 110*a* and second fixed portion 110*b* can be configured to pass substantially equal currents to first terminus 115. This can involve first fixed portion 110*a* and second fixed portion 110*b* being substantially equally sized, or they can have different sizes to account for volumetric differences. However the elements are sized, an objective of the configuration can be for the two separate paths to have substantially matched inductances to achieve a desired current split between the two paths, which can thereby lower the effective resistance of the system. Balancing the inductances on the separate paths in this manner can prevent current from flowing only in one path having the lower of two inductances.

Figure 2A:
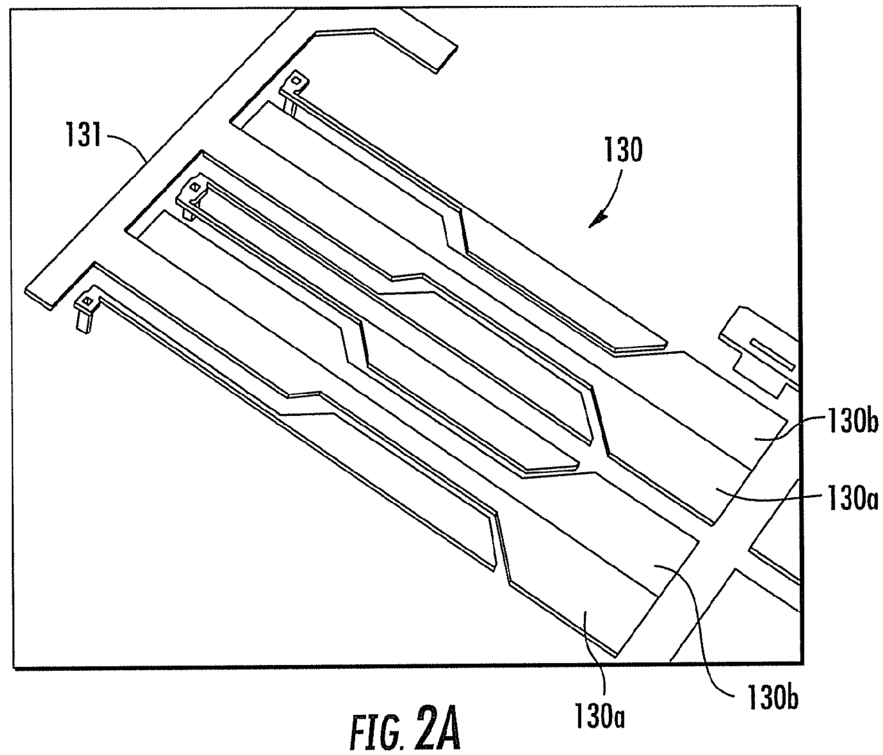
FIG. 2A is a perspective view of a first movable metal layer of a micro-electromechanical systems (MEMS) device according to an embodiment of the presently disclosed subject matter.

Alternatively or in addition to splitting first metal layer 110 to define multiple current paths, as indicated above, the concept of current splitting discussed above with respect to fixed metal layer 110 can be applied to any of a variety of other current-carrying structures in variable capacitor 100. For instance, referring to FIGS. 2A and 2B, first movable metal layer 130 can be slotted or otherwise patterned such that first movable metal layer 130 comprises a first movable portion 130*a* and a second movable portion 130*b* that is electrically separated from first movable portion 130*a*. In particular, for example, first movable metal layer 130 can be split substantially in half by a longitudinal slot (e.g., about 0.8 μm). Alternatively, as discussed above, first movable metal layer 130 can be split into more than two different portions.

Figure 2B:
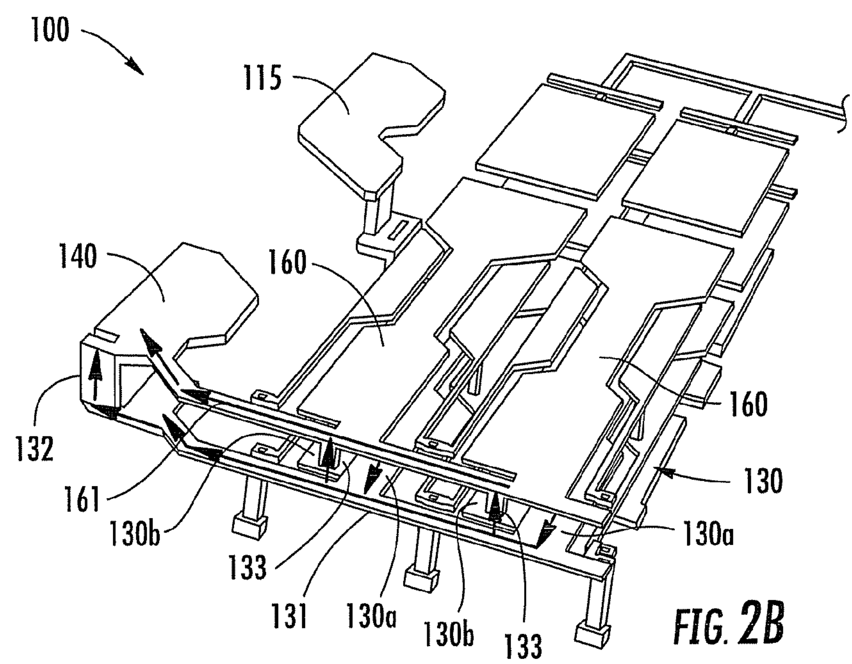
FIG. 2B is a perspective view of a second set of electrical connections within a micro-electromechanical systems (MEMS) device according to an embodiment of the presently disclosed subject matter.

Each of first movable portion 130*a* and second movable portion 130*b* can be independently connected to a second terminus 140 (e.g., a second flip chip pad, bond pad, or other terminal structure) as shown in FIG. 2B. In this way, first movable portion 130*a* can define a first path between first movable metal layer 130 and second terminus 140, and second movable portion 130*b* can define a second path between first movable metal layer 130 and second terminus 140. Accordingly, currents developed in first movable metal layer 130 can be distributed among these multiple discrete paths en route to second terminus 140.

Figure 3A:
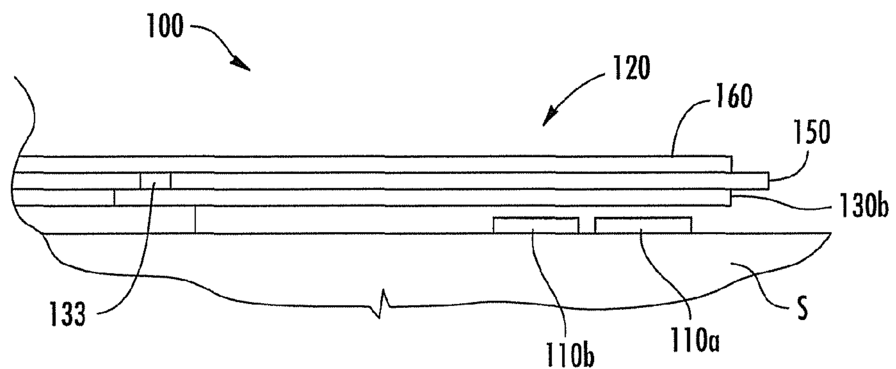
FIGS. 3A and 3B are side cutaway views of two configurations for a micro-electromechanical systems (MEMS) device according to an embodiment of the presently disclosed subject matter.
Figure 3B:
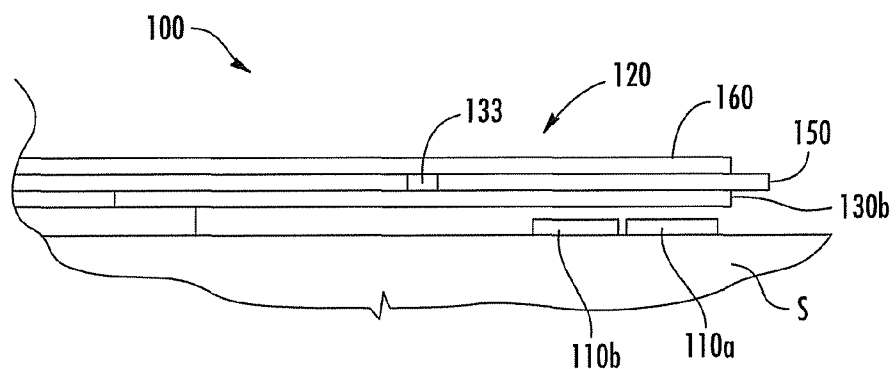
Figure 4A:
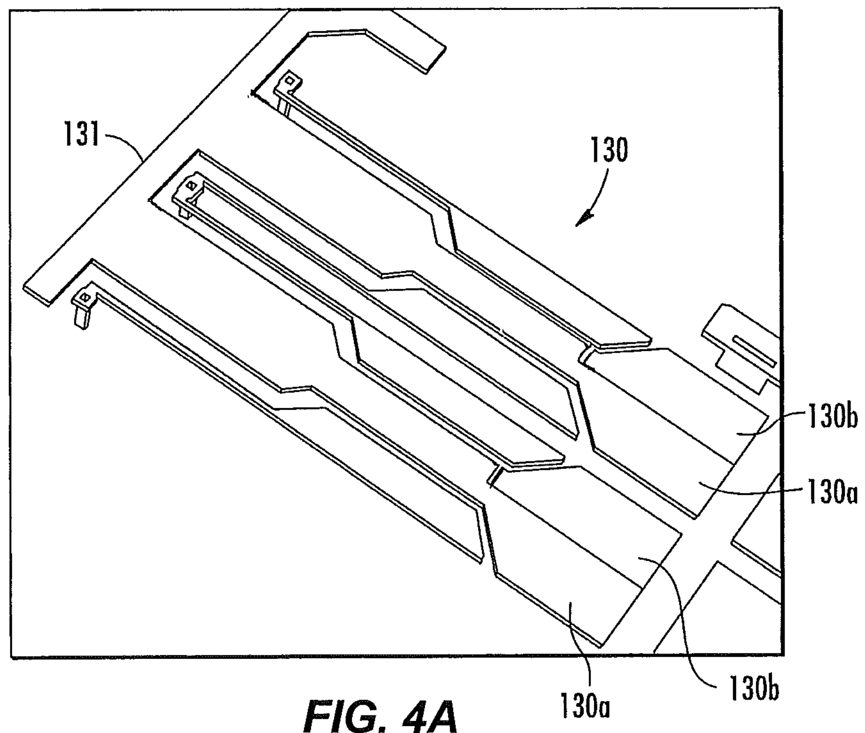
FIG. 4A is a perspective view of a first movable metal layer of a micro-electromechanical systems (MEMS) device according to an embodiment of the presently disclosed subject matter.
Figure 4B:
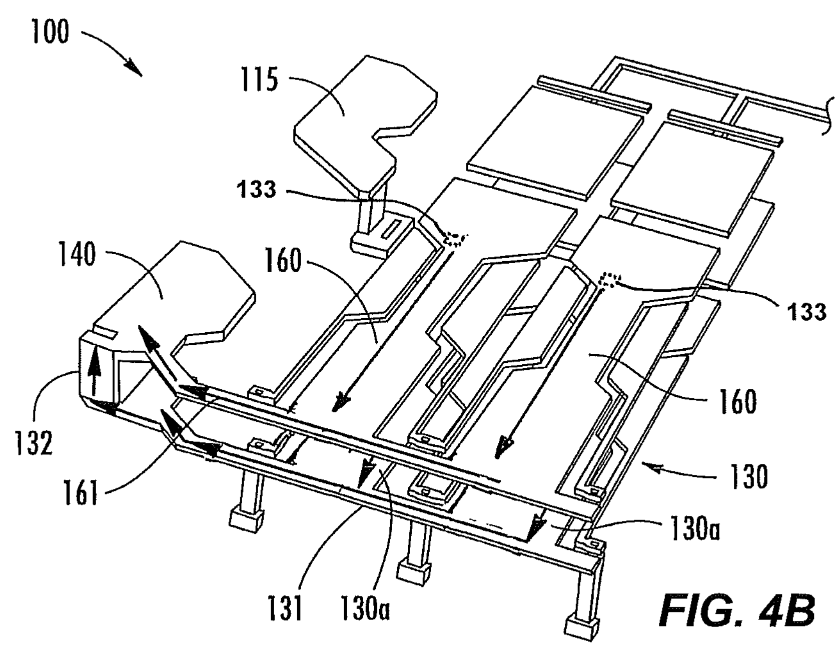
FIG. 4B is a perspective view of a second set of electrical connections within a micro-electromechanical systems (MEMS) device according to an embodiment of the presently disclosed subject matter.

For example, referring to FIG. 2B, first movable portion 130*a* can be connected to a first root feed 131, which is in communication with a fifth via 132 that is in turn connected to second terminus 140. In contrast, second movable portion 130*b* can be patterned such that it does not extend all the way to first root feed 131. Rather, a sixth via 133 can be provided in communication with second movable portion 130*b*, and sixth via 133 can be connected to a second movable metal layer 160 that is positioned on movable beam 120 and spaced apart from first movable metal layer 130 by structural dielectric layer 150. Sixth via 133 can be positioned near a root section of movable beam 120 (See, e.g., FIG. 3A), at or near a point along the length of movable beam 120 (See, e.g., FIG. 3B), or at any other point along the length of second movable portion 130*b*. Further in this regard, as shown in FIGS. 4A and 4B, sixth via 133 can be positioned near a capacitive end portion of second movable portion 130*b* such that the first path between first movable metal layer 130 and second terminus 140 can span the width of first movable metal layer 130 along a substantial fraction of the length of first movable metal layer 130, and the second path between first movable metal layer 130 and second terminus 140 can extend along a substantial fraction of the length of second movable metal layer 160. Second movable metal layer 160 can then be connected to a second root feed 161 that is in communication with second terminus 140.

Regardless of the specific configuration, the general principle remains that multiple current paths can be provided for routing the current across multiple metal layers of variable capacitor 100. In the particular configuration shown in FIGS. 2A, 2B, 4A, and 4B, for example, only half of the current conducted by first movable metal layer 130 is routed through first root feed 131 (i.e., by way of first movable portion 130*a*), with the other half being routed through second root feed 161 (i.e., by way of second movable portion 130*b*, sixth via 133, and second movable metal layer 160). As a result, because first and second root feeds 131 and 161, respectively, need carry only about half of the current conducted by first movable metal layer 130, each element can be reduced to about half of the width that it would have been in conventional systems for the size of first movable metal layer 130. Accordingly, this reduction in the size of each root feed can result in a reduction in $C_{min}$ without a significant change in Q.

To achieve a desired distribution of current between the multiple paths, first movable portion 130*a* and second movable portion 130*b* can be configured to be substantially equally sized, or first movable portion 130*a* and second movable portion 130*b* can be different sizes. Regardless of the specific sizing, first movable portion 130*a* and second movable portion 130*b* can be configured such that the first path (i.e., between first movable portion 130*a* and second terminus 140) and the second path (i.e., between second movable portion 130*b* and second terminus 140) have substantially similar inductances.

Figure 5:
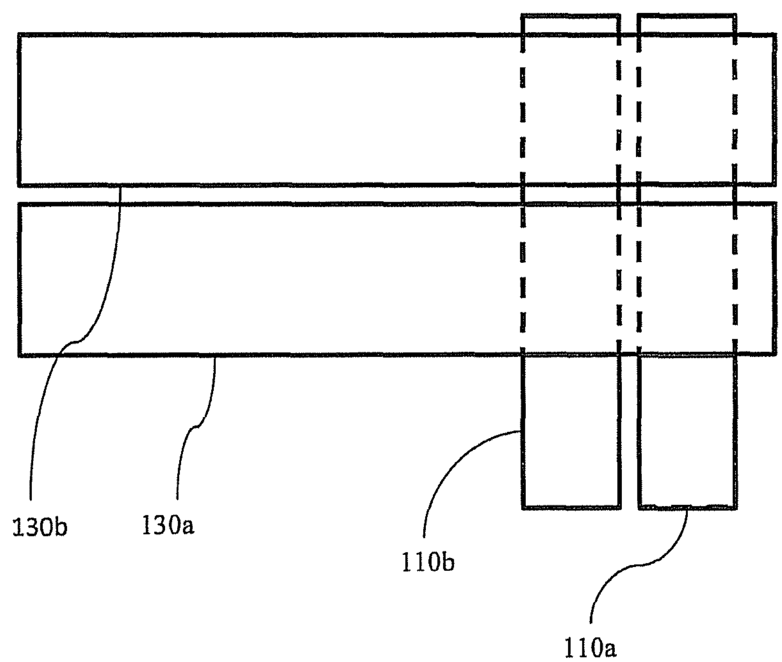
FIG. 5 is a plan view of an overlap between a first movable metal layer and a fixed metal layer of a micro-electromechanical systems (MEMS) device according to an embodiment of the presently disclosed subject matter.

Alternatively, the relative currents for each of the first path and the second path can largely be determined by the area of overlap between first movable metal layer 130 and fixed metal layer 110 (e.g., because the main voltage drop is across the capacitive structure). In this regard, as shown in FIG. 5, where first movable portion 130*a* defines a first capacitive portion that is positioned above a first segment of fixed metal layer 110 (e.g., a continuous segment or a split segment comprising multiple sections), and second movable portion 130*a* defines a second capacitive portion that is positioned above a second segment of fixed metal layer 110 (e.g., a continuous segment or a split segment comprising multiple sections), the first and second capacitive portions can be sized or otherwise configured to create a first current fraction to be routed through the first path and a second current fraction to be routed through the second path, respectively. (e.g., by controlling the capacitance between the first and second capacitive portions and the first and second segments of fixed metal layer 110, respectively) In addition, the remainder of first movable portion 130*a* and second movable portion 130*b*, which can be referred to as a first non-capacitive portion and a second non-capacitive portion, respectively, can further be sized or otherwise configured such that the resistance for each of the first path and the second path is inversely proportional to the first current fraction and the second current fraction, respectively.

In another aspect, the present subject matter can further involve methods for the construction of a MEMS device that incorporates the current splitting and routing techniques discussed above. Specifically, such a method can comprise positing or disposing fixed metal layer 110 on substrate S and patterning fixed metal layer 110 to define first fixed portion 110*a* and second fixed portion 110*b*. First fixed portion 110*a* and second fixed portion 110*b* of first movable metal layer 110 can be connected to first terminus 115 (e.g., by first and second vias 111 and 112 and by third and fourth vias 113 and 114, respectively), wherein first fixed portion 110*a* defines a first path between fixed metal layer 110 and first terminus 115, and second fixed portion 110*b* defines a second path between fixed metal layer 110 and first terminus 115.

The method can further comprise depositing a sacrificial layer on fixed metal layer 110, and depositing first movable metal layer 130 on the sacrificial layer. First movable metal layer 130 can be patterned to define first movable portion 130*a* and second movable portion 130*b* that is electrically separated from first movable portion 130*a*. Structural dielectric layer 150 can be deposited on first movable metal layer 130, sixth via 133 can be patterned and etched in structural dielectric layer 150 in communication with second movable portion 130*b*, and second movable metal layer 160 can be deposited on structural dielectric layer 150. First movable portion 130*a* and second movable portion 130*b* can be connected to second terminus 140, wherein first movable portion 130*a* defines a first path between first movable metal layer 130 and second terminus 140 (e.g., by way of first root feed 131 and fifth via 132), and second movable portion 130*b* defines a second path between first movable metal layer 130 and second terminus 140 (e.g., by way of sixth via 133 and second movable metal layer 160). The sacrificial layer can then be removed to allow movable beam 120 to move and capacitive coupling between fixed metal layer 110 and first movable metal layer 130.

Figure 6:
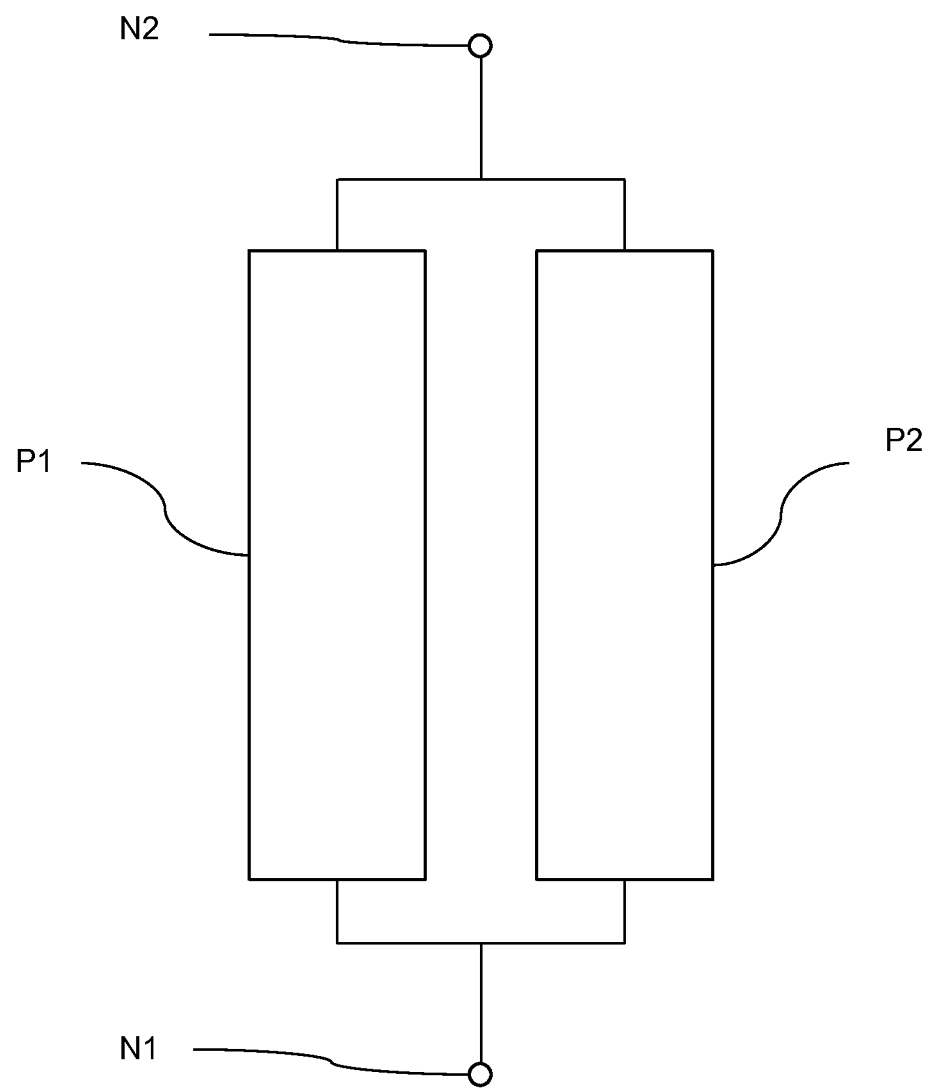
FIG. 6 is a block diagram illustrating a generalized configuration of a micro-electromechanical systems (MEMS) device having multiple current paths according to an embodiment of the presently disclosed subject matter.

In any configuration, the devices, systems, and methods disclosed herein can be used for lowering the total effective resistance of the RF MEMS device using split electrodes. As shown in FIG. 6, for example, both a first path P1 and a second path P2 can provide connections between a first node N1 (e.g., first terminus 115) and a second node N2 (e.g., second terminus 140), and the characteristics of first path P1 and second path P2 (e.g., size, path inductance, path capacitance) can be configured to achieve a desired current split between the two paths, which can thereby lower the effective resistance of the system. As discussed above, this lowering of resistance can be accomplished, for example, by matching inductances on two separate paths on two separate metal layers, resulting in a desired and/or predetermined current split between the two layers to maximize the Q-factor. In this way, use of these principles can be used to create high Q, low parasitic RF MEMS devices using metal-thickness-limited CMOS/MEMS processes.

The present subject matter can be embodied in other forms without departure from the spirit and essential characteristics thereof. The embodiments described therefore are to be considered in all respects as illustrative and not restrictive. Although the present subject matter has been described in terms of certain preferred embodiments, other embodiments that are apparent to those of ordinary skill in the art are also within the scope of the present subject matter. For instance, although the embodiments disclosed are largely related to the design of a variable capacitor, those having skill in the art will appreciate that the current splitting and routing techniques disclosed herein can be applied to any of a variety of related components, devices, and/or systems.

What is claimed is:

1. A micro-electromechanical systems (MEMS) device comprising:

a fixed metal layer positioned on a substrate;

a movable beam spaced apart from the fixed metal layer and movable with respect to the substrate, the movable beam comprising a first movable metal layer capacitively coupled to the fixed metal layer, the first movable metal layer comprising at least a first movable portion and a second movable portion that is electrically separated from the first movable portion; and a terminus independently connected to each of the first movable portion and the second movable portion of the first movable metal layer;

wherein the first movable portion defines a first path between the first movable metal layer and the terminus, and the second movable portion defines a second path between the first movable metal layer and the terminus.

2. The device of claim 1, wherein one or both of the fixed metal layer and the first movable metal layer comprises slots or other patterns.

3. The device of claim 1, wherein the movable beam comprises:

a structural dielectric layer positioned on the first movable metal layer; and a second movable metal layer positioned on the structural dielectric layer, the second movable metal layer being electrically connected to the first movable portion through a via in the structural dielectric layer, and the second movable metal layer being electrically connected to the terminus.

4. The device of claim 1, wherein the first movable portion and the second movable portion are substantially equally sized.

5. The device of claim 1, wherein the first movable portion and the second movable portion are different sizes.

6. The device of claim 1, wherein a first capacitive portion of the first movable metal layer is positioned above a first segment of the fixed metal layer, and a second capacitive portion of the second movable metal layer is positioned above a second segment of the fixed metal layer; and wherein the first movable portion and the second movable portion are configured such that an overlap of the first capacitive portion with the first segment and of the second capacitive portion with the second segment creates a first current fraction to be routed through the first path and a second current fraction to be routed through the second path, respectively.

7. The device of claim 6, wherein the first path between the first movable metal layer and the terminus has a first resistance, and the second path between the first movable metal layer and the terminus has a second resistance; and wherein the first movable portion and the second movable portion are configured such that the first resistance and the second resistance are inversely proportional to the first current fraction to be routed through the first path and the second current fraction to be routed through the second path, respectively.

8. A micro-electromechanical systems (MEMS) device comprising:

at least one fixed metal layer positioned on a substrate;

a first terminus independently connected to each of the at least one fixed metal layer;

a movable beam spaced apart from the fixed metal layer, the movable beam comprising at least one movable metal layer that is capacitively coupled to the at least one fixed metal layer; and a second terminus independently connected to each of the at least one movable metal layer;

wherein one or both of the at least one fixed metal layer or the at least one movable metal layer defines at least a first path between the first terminus and the second terminus and a second path between the first terminus and the second terminus.

* * * * *